(No Model.)
J. J. TOWER.
LEMON SQUEEZER.
No. 271,002. Patented Jan. 23, 1883.
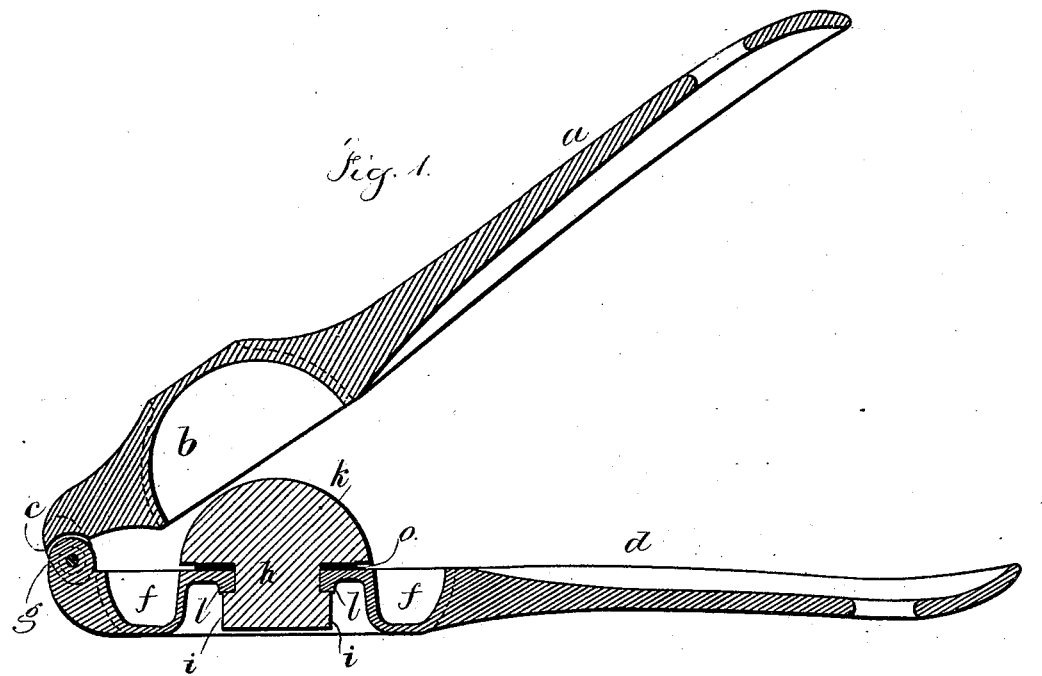
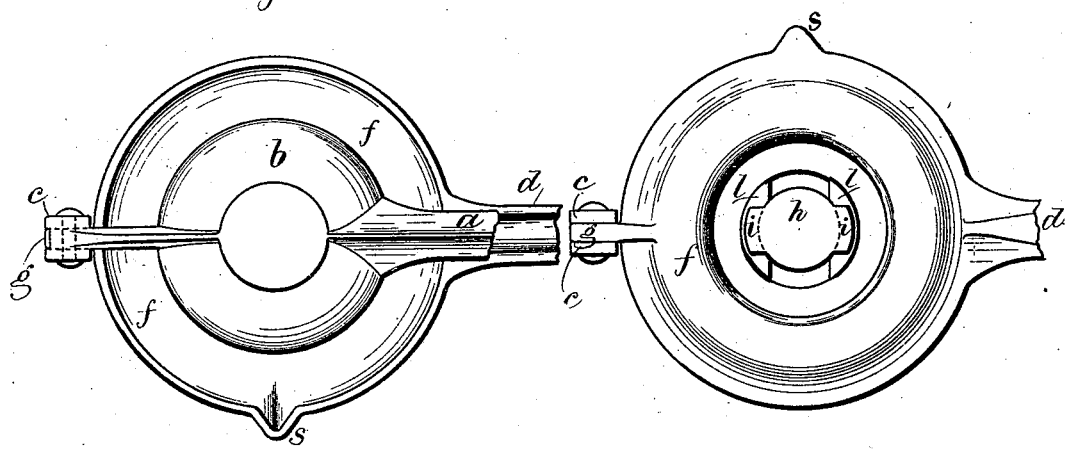
Witnesses
J. Staib
Chas H. Smith
Inventor
John J. Tower
Lemuel W. Serrell
Atty

UNITED STATES PATENT OFFICE.

JOHN J. TOWER, OF BROOKLYN, NEW YORK.

LEMON-SQUEEZER.

SPECIFICATION forming part of Letters Patent No. 271,002, dated January 23, 1883.

Application filed May 22, 1882. (No model.)

*To all whom it may concern:*

Be it known that I, JOHN J. TOWER, of Brooklyn, in the county of Kings and State of New York, have invented an Improvement in Lemon-Squeezers, of which the following is a correct description.

Lemon-squeezers have been made with a pair of lever-handles united at one end, and with pressing devices intermediate to the joint and handle portions, and the squeezers have been made either of wood or metal, and in some instances a porcelain knob has been connected with the squeezer, and upon this the lemon has been placed, or else it has been used to force the lemon into a perforated cup.

My invention relates to the combination, in a lemon-squeezer, of the hinged lever-handles, one of which has a pressing-cup, and the other has a trough-shaped annular dish having a raised central portion, with a removable vitrified block, having a central stem passing through the center of the said raised portion of the dish, and secured by projections and inclines, and an elastic washer of india-rubber is used between the porcelain and the metal, for the twofold purpose of forming an even bearing for the porcelain block, and thus preventing it being injured, and for preventing leakage of juice between the metal and the said porcelain. By this improvement the vitrified portion of the squeezer that comes into contact with the interior of the lemon is supported by the raised portion of the metal disk, and is not liable to be injured by the pressure thereon, and the juice is received into such dish and can be poured from the same into a tumbler or other vessel.

In the drawings, Figure 1 is a longitudinal section. Fig. 2 is an inverted plan of the squeezer with the handle broken off, and Fig. 3 is a plan of the squeezer with the handle broken off.

The handle $a$, cup $b$, and hinge-pieces $c$ are cast in one, and the handle $d$, annular dish $f$, and hinge-piece $g$ are cast in one. These parts are united by the hinge-pin, and they should be carefully turned. There is an opening in the raised middle portion of the dish $f$, such opening being adapted to pass through it the round stem $h$ of the porcelain or vitrified hemispherical knob $k$, and also to pass the blocks $i$ that are upon the stem of this knob, so that the knob will be secured in place by a partial rotation, which turns the blocks $i$ beneath the inclined portions $l$. The reverse movement is given to the parts for separating the knob from the dish. The washer of india-rubber at $o$ forms a bearing for the porcelain knob, and also makes the joint tight, so that juice will not pass in between the knob and the metal of the dish. The juice from the lemon, as pressed between the knob $k$ and the cup $b$, is received into the annular dish $f$, and can be poured from the spout $s$.

I claim as my invention—

The combination, in a lemon-squeezer, of one handle and cup, made in one piece, a second handle and trough-shaped annular dish, made in one piece, and having an opening through the raised central portion, a hinge for uniting the two parts, and a vitrified knob having a circular stem, and projections passing through the central opening and interlocking and resting upon the raised central metallic portion, substantially as set forth.

Signed by me this 17th day of May, A. D. 1882.

JOHN J. TOWER.

Witnesses:
GEO. T. PINCKNEY,
WILLIAM G. MOTT.